United States Patent
Coyaso et al.

[11] Patent Number: 5,826,827
[45] Date of Patent: Oct. 27, 1998

[54] AIR-CHUTE SAFETY SYSTEM

[76] Inventors: Richard Coyaso; Levaina Coyaso, both of P.O. Box 10459, Hilo, Hi. 96721

[21] Appl. No.: 851,571

[22] Filed: May 5, 1997

[51] Int. Cl.[6] .......................... B64C 25/56; B64D 17/22; B64D 45/04
[52] U.S. Cl. .......................... 244/139; 244/107; 244/147
[58] Field of Search .............................. 244/138 R, 139, 244/144, 147, 107, 137.3

[56] References Cited

U.S. PATENT DOCUMENTS

| | | | |
|---|---|---|---|
| 1,583,745 | 5/1926 | Procopio | 244/139 |
| 2,018,448 | 10/1935 | Juergens | 244/139 |
| 2,352,721 | 7/1944 | Krahel | 244/147 |
| 2,944,771 | 7/1960 | Bush | 244/138 R |
| 3,051,420 | 8/1962 | Novak | 244/147 |
| 3,315,920 | 4/1967 | Caughron | 244/139 |
| 3,499,623 | 3/1970 | Markham et al. | 244/139 |
| 3,726,493 | 4/1973 | Muller | 244/139 |
| 3,796,398 | 3/1974 | Eilertson | 244/139 |
| 3,833,192 | 9/1974 | Vitack et al. | 244/139 |
| 4,050,658 | 9/1977 | Murphy | 244/139 |
| 4,113,208 | 9/1978 | Manfredi | 244/147 |
| 4,445,654 | 5/1984 | Handbury et al. | 244/139 |
| 4,480,807 | 11/1984 | Bowen | 244/147 |
| 4,676,457 | 6/1987 | Allen | 244/17.15 |
| 4,709,884 | 12/1987 | Gustafson | 244/139 |
| 5,356,097 | 10/1994 | Chalups | 244/139 |
| 5,560,568 | 10/1996 | Schmittle | 244/139 |

*Primary Examiner*—Virna Lissi Moica
*Attorney, Agent, or Firm*—Michael I. Kroll

[57] ABSTRACT

An air-chute safety system (10) for an aircraft (12) having a fuselage (14) with a cockpit (16) and a tail end (18), and a pair of wings (20) with engines (22). The system (10) comprises a plurality of drag parachutes (24) stored in and deployed from the tail end (18) of the fuselage (14), in conjunction with an aerodynamic braking apparatus in the aircraft (12), which will shut down the engines (22) during an emergency when in flight, so that the aircraft (12) will slow down. A plurality of top parachutes (26) are provided. A structure (28) is for storing each of the top parachutes (26) in vertical spaced apart relationships below a top surface (30) of the fuselage (14) between the cockpit (16) and tail end (18) thereof. A component (32) is for deploying each of the top parachutes (26) from above a bottom surface (34) of the fuselage (14) and below each of the storing structures (28), through the top surface (30) of the fuselage (14), after the drag parachutes (24) are deployed, so that the aircraft (12) will slowly and safely float down to the earth.

11 Claims, 4 Drawing Sheets

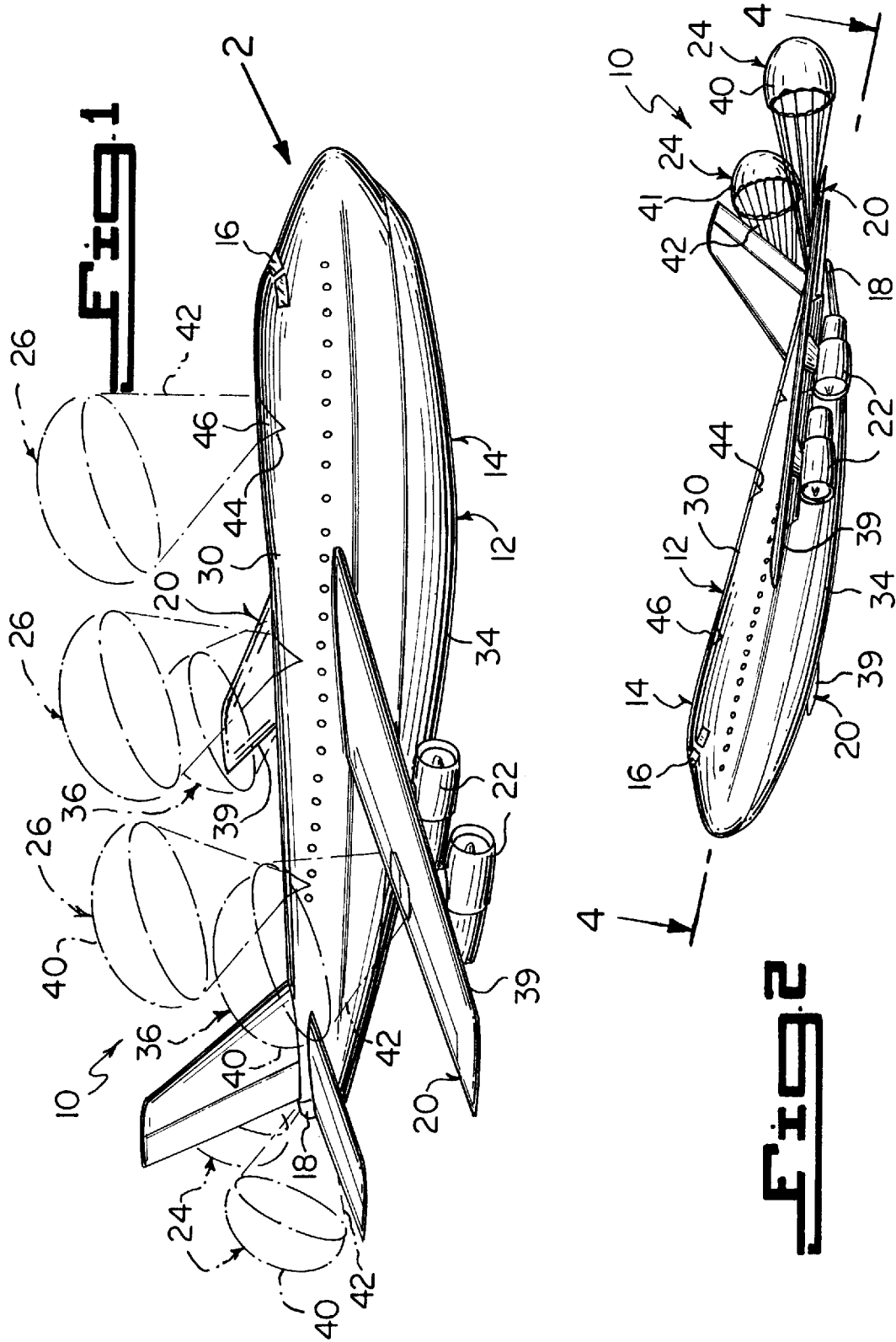

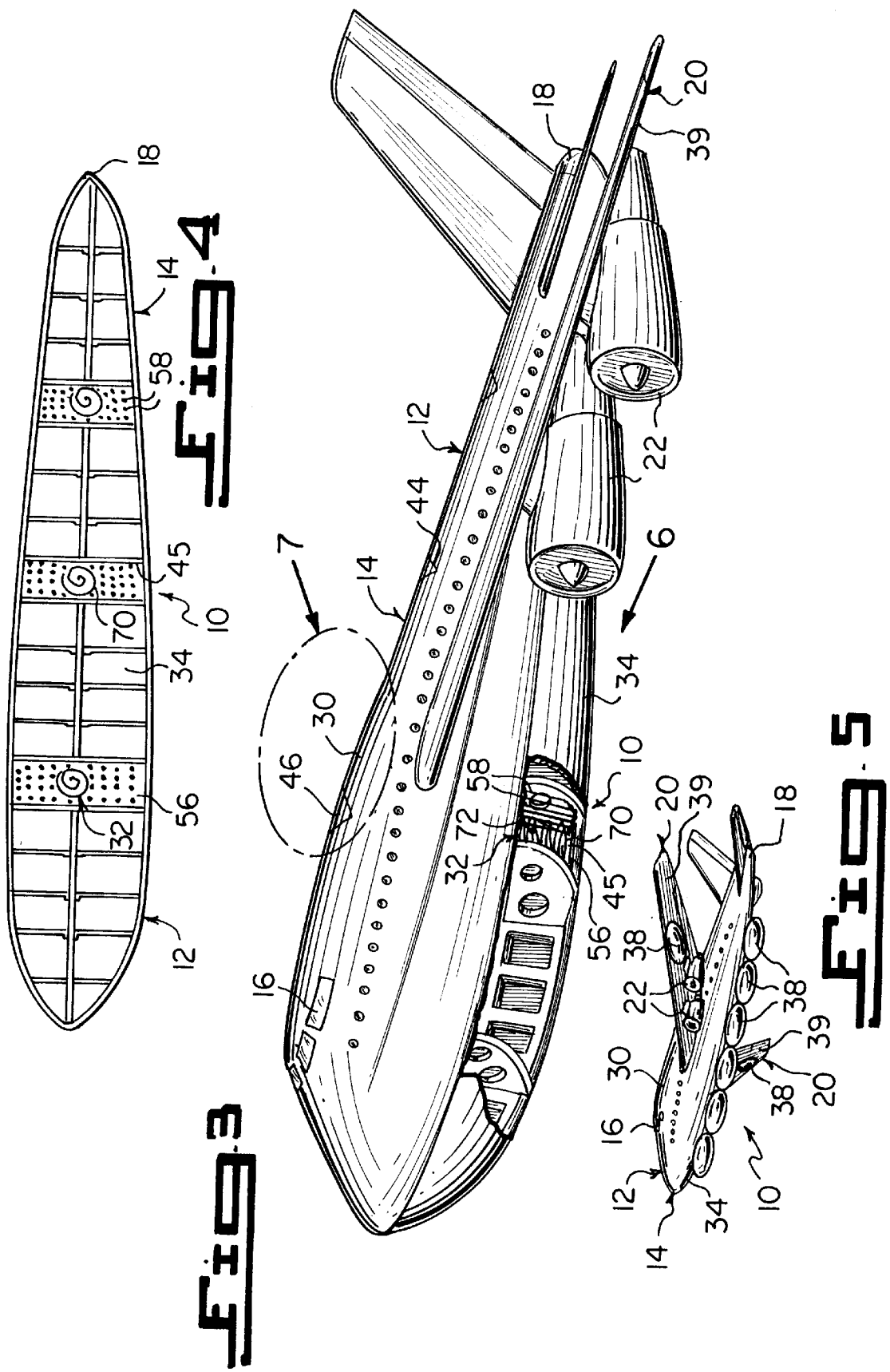

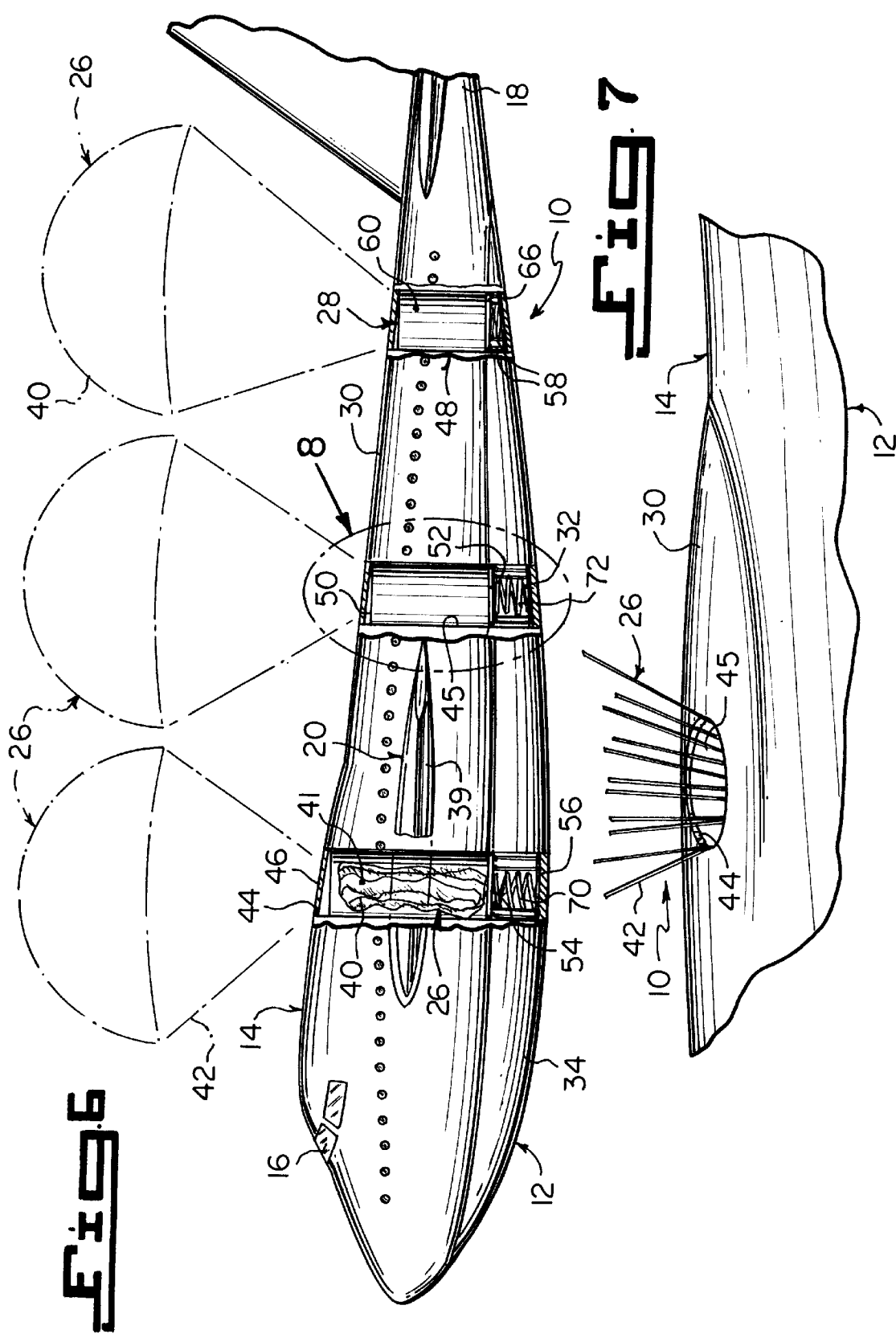

AIR-CHUTE SAFETY SYSTEM

BACKGROUND OF THE INVENTION

1. Field of the Invention

The instant invention relates generally to aircraft emergency landing devices and more specifically it relates to an air-chute safety system. The air-chute safety system will allow the manual deployment of drag chutes, top chutes and bottom inflatable rafts from an aircraft flying in distress, so that the aircraft can now land safely and softly on the ground or on water.

2. Description of the Prior Art

Numerous aircraft emergency landing devices have been provided in prior art. For example, U.S. Pat. Nos. 3,499,623 to Markham et al.; 4,050,657 to Murphy; 4,445,654 to Handbury et al.; 4,676,457 to Allen; 4,709,884 to Gustafson and 5,356,097 to Chalupa all are illustrative of such prior art. While these units may be suitable for the particular purpose to which they address, they would not be as suitable for the purposes of the present invention as heretofore described.

MARKHAM, ODELL C.

FERGUSON, ALAN C.

PARACHUTE-PROTECTED AIRCRAFT

U.S. Pat. No. 3,499,623

A parachute-protected aircraft having a fuselage and a normally folded parachute connected to the top of the fuselage by a long tethering rope. The top and bottom of the fuselage are interconnected by a vertical strut passing through the central fuselage area. The strut has a substantially direct connection with the tethering rope whereby forces imposed by the latter on the aircraft are applied to both the fuselage top and the fuselage bottom or floor.

MURPHY, PHILIP

AIRCRAFT PARACHUTE SAFETY SYSTEM

U.S. Pat. No. 4,050,657

An airplane parachute device includes parachutes and release mechanism mounted in the upper surface of the aircraft's fuselage. A releasable hatch, covers each parachute and release mechanism, and is in operable communication with the pilot's compartment to allow for remote controlled release. The parachutes are under similar remote control and are ejected from the parachute compartments by a coiled spring system. Each parachute is aided in opening by an inflatable collar affixed to the outer rim. A shock absorbing piston is mounted to the bottom of the parachute compartment and to the tether lines of the parachute.

HANDBURY, JAMES W.

HANDBURY, DANA

AIRCRAFT RECOVERY CHUTE

U.S. Pat. No. 4,445,654

An ultralight aircraft and/or pilot recovery system includes a parachute having a canopy connected by means of a plurality of shroud lines to a first elongated cable having a length to position the parachute clear of the aircraft engine and propeller with a second cable for connecting the parachute to the frame of the aircraft. A harness is worn by the pilot which includes a pouch for containing the canopy folded within an inner pouch to permit the pilot to grasp and toss the chute clear of the aircraft for deployment for recovery of the aircraft. An alternate embodiment provides for connecting the parachute to the harness worn by the pilot and securing the harness to the aircraft to thereby give the pilot the option to recover the aircraft or cut loose from the aircraft for pilot recovery only.

ALLEN, SEBREE J.

AIRCRAFT EMERGENCY LANDING SYSTEM

U.S. Pat. No. 4,676,457

An emergency landing system for an aircraft, particularly a helicopter, in which a plurality of rocket members are mounted on the fuselage of the aircraft and directed downward about the center of gravity of the fuselage. The rocket members are activated to direct upward reactive forces by the energization of a proximity switch located on the fuselage and adapted to sense the ground level when the fuselage has descended within a predetermined elevation above the ground level, so that the downward movement of a disabled aircraft is substantially decelerated to provide a soft landing for the aircraft. The landing system may be adapted for use on a fixed wing aircraft by directing the rocket members to exert reactive forces rearward as well as upward to retard the forward as well as downward movement of a disable fixed wing aircraft.

GUSTAFSON, TROY C.

PARACHUTE APPARATUS FOR MODEL AIRPLANE

U.S. Pat. No. 4,709,884

A parachute for a powered model airplane in which the parachute is ejected downwardly by an ejection cartridge which may be installed for ejection of the parachute after the parachute is packed into its container in the airplane, and just prior to the take off of the airplane.

CHALUPA, STEFAN

SEGMENTED SAFETY AIRCRAFT

U.S. Pat. No. 5,356,097

An aircraft includes a cockpit permanently connected to a fuselage base. At least one fuselage segment is detachably mounted to the support. In case of an imminent crash, the segment is detachable from the remainder of the aircraft and can float to safety after being detached by having at least one parachute and an air bag secured to the segment.

SUMMARY OF THE INVENTION

The function of the air-chute safety system is to bring any given airplane, especially passenger airplanes whether big or small, that get into an emergency situation safely to the ground without casualties. The main purpose is to try to save the lives of the people that travel via the airline industry, should any given aircraft experience any type of emergency situation where the pilot may lose control of the aircraft. People would feel a lot safer flying in the airplane, if they knew that there is something that would give them at least a small chance of survival should there be an emergency.

A primary object of the present invention is to provide an air-chute safety system that will overcome the shortcomings of the prior art devices.

Another object is to provide an air-chute safety system that will help save the lives of people on board an aircraft, as well as the luggage, cargo and the entire aircraft, which will land safely and softly on the ground or on water. The FAA, NTSB and any other agency necessary can examine it to see just exactly what went wrong with the aircraft. Unless its been blown to pieces by a bomb or explosive unit, the flight data recorder that is usually so crucial to the investigation, will be retrieved in one piece.

An additional object is to provide an air-chute safety system that will eliminate the need to spend countless hours trying to recover bodies and crashed aircraft parts, will give people on the ground ample time to evacuate an area in which the aircraft will descend into and could help in terrorist threatening situations.

A further object is to provide an air-chute safety system that is simple and easy to use.

A still further object is to provide an air-chute safety system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 is a perspective view of an aircraft incorporating the instant invention and showing the drag parachutes, the top parachutes and the wing parachutes deployed therefrom in phantom.

FIG. 2 is a perspective view taken in the direction of arrow 2 in FIG. 1, showing only the drag parachutes deployed from the aircraft.

FIG. 3 is an enlarged perspective view similar to FIG. 2, showing a lower portion of the fuselage broken away to see part of a storing structure and deployment component for one top parachute therein.

FIG. 4 is a diagrammatic cross sectional view taken along line 4—4 in FIG. 2, showing where the storing structures and deployment components are located in the fuselage for the top parachutes.

FIG. 5 is a perspective view similar to FIG. 2, showing the inflatable rafts deployed along the bottom surface of the fuselage and the bottom surfaces of the wings.

FIG. 6 is a side view taken in the direction of arrow 6 in FIG. 3, with parts broken away and in section, showing the storing structures and deployment components for the top parachutes within the fuselage and the top parachutes deployed therefrom in phantom.

FIG. 7 is an enlarged perspective view of an area indicated by arrow 7 in FIG. 3, showing the shroud lines of one top parachute extending from the opening in the top surface of the fuselage.

Similar reference characters denote corresponding features consistently throughout the attached drawings.

DETAILED DESCRIPTION OF THE PREFERRED EMBODIMENTS

Figure 8:
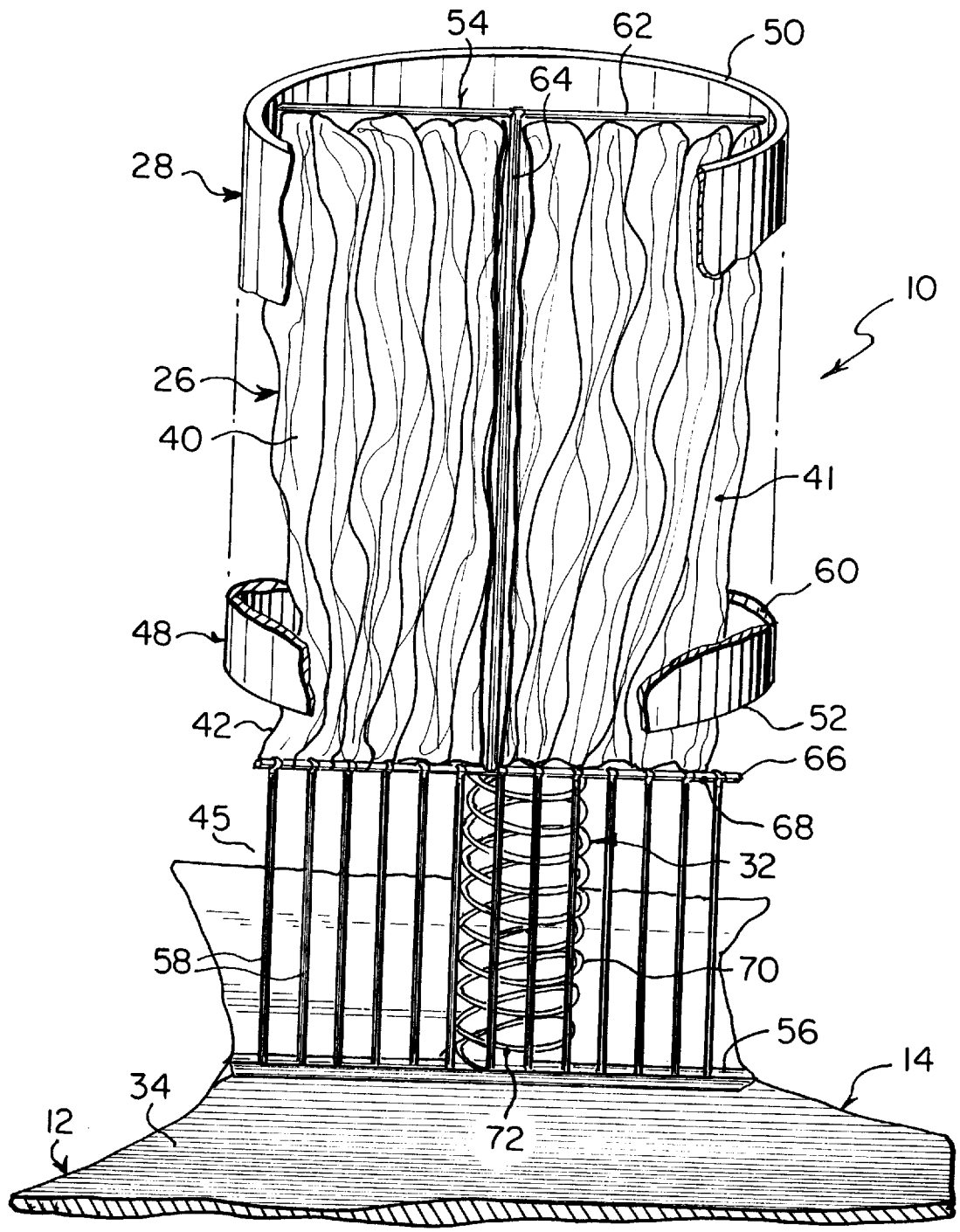
FIG. 8 is an enlarged perspective view of an area indicated by arrow 8 in FIG. 6, showing the storing structure and deployment component of one top parachute broken away and in section.

Turning now descriptively to the drawings, in which similar reference characters denote similar elements throughout the several views, FIGS. 1 through 8 illustrate an air-chute safety system 10 for an aircraft 12 having a fuselage 14 with a cockpit 16 and a tail end 18, and a pair of wings 20 with engines 22. The system 10 comprises a plurality of drag parachutes 24 stored in and deployed from the tail end 18 of the fuselage 14, in conjunction with an aerodynamic braking apparatus in the aircraft 12, which will shut down the engines 22 during an emergency when in flight, so that the aircraft 12 will slow down. A plurality of top parachutes 26 are provided. A structure 28 is for storing each of the top parachutes 26 in vertical spaced apart relationships below a top surface 30 of the fuselage 14 between the cockpit 16 and tail end 18 thereof. A component 32 is for deploying each of the top parachutes 26 from above a bottom surface 34 of the fuselage 14 and below each of the storing structure 28, through the top surface 30 of the fuselage 14, after the drag parachutes 24 are deployed, so that the aircraft 12 will slowly and safely float down to the earth.

A plurality of wing parachutes 36, as shown in phantom in FIG. 1, are stored in and deployed from the wings 20, so as to stabilize the aircraft 12 when it slowly and safely floats down to the earth. A plurality of inflatable rafts 38, as shown in FIG. 5, are stored in and deployed from the bottom surface 34 of the fuselage 14 along a longitudinal axis thereof and the bottom surfaces 39 of the wings 20. The inflatable rafts 38 are filled with oxygen from the aircraft 12, to help ease an impact of the aircraft 12 upon reaching the ground on the earth and protect the engines 22 from damage. The inflatable rafts 38 will help the aircraft 12 to float and stay upright if it should land on a body of water, until such time that rescuers could get to the aircraft 12.

Each drag parachute 24, top parachute 26 and wing parachute 36 includes a canopy 40 fabricated out of a strong, lightweight, fireproof material 41. A plurality of shroud lines 42 extend from the canopy 40.

Each storing structure 28 includes the fuselage 14 having an opening 44 in the top surface 30, with a compartment 45 extending to the bottom surface 34 thereof. A hatch 46 is removably affixed to the top surface 30 of the fuselage 14 over the opening 44. A cylindrical canister 48 is provided, having an open top end 50 and an open bottom end end 52. The cylindrical canister 48 is retained in the compartment 45 directly under the hatch 46 in the fuselage 14. A parachute foundation holder 54 is disposed into the cylindrical canister 48. The canopy 40 of the top parachute 26 is packed into the cylindrical canister 48 with the shroud lines 42 connected to the parachute foundation holder 54. A base member 56 is mounted to the interior of the bottom surface 34 of the fuselage 14 within the compartment 45. A plurality of elastic cords 58 extend between the base member 56 and the parachute foundation holder 54.

The cylindrical canister 48 is fabricated out of a strong durable material 60. The parachute foundation holder 54, as best seen in FIG. 8, consists of a top crossbar 62, with a middle vertical rod 64 affixed at a first end to the top crossbar 62. A bottom crossbar 66 is affixed to a second end of the middle vertical rod 64 opposite from the top crossbar 62, so as to form a generally I-shaped configuration. The parachute foundation holder 54 is fabricated out of a strong durable material 68.

Each deploying component 32 is a large compressible coil spring 70 extending between the bottom of the parachute foundation holder 54 and the top of the base member 56. When the hatch 46 is manually opened from within the aircraft 12, the coil spring 70 will force the parachute foundation holder 54 with the top parachute 26 upwardly through the cylindrical canister 48, so that the top parachute 26 will exit through the opening 44 in the top surface 30 of the fuselage 14. The coil spring 70 is fabricated out of a strong flexible durable material 72.

The storing structure 28 and the deploying component 32 for the top parachutes 26 as shown in the drawings, are also used in the tail end 18 of the fuselage 14 for the drag parachutes 24 and in the wings 20 for the wing parachutes 36. The pilot or other personnel of the aircraft 12 can manually operate a master switch during an emergency situation in flight, so as to deploy the drag parachutes 24, operate the aerodynamic braking apparatus, shut down the engines 22, deploy the top parachutes 26, deploy the wing parachutes 36 and deploy the inflatable rafts 38.

LIST OF REFERENCE NUMBERS 10 air-chute safety system
12 aircraft
14 fuselage of 12
16 cockpit in 14
18 tail end in 14
20 wing of 12
22 engine on 20
24 drag parachute of 10 in 18
26 top parachute of 10 in 14
28 storing structure of 10 in 14
30 top surface of 14
32 deploying component of 10 in 14
34 bottom surface of 14
36 wing parachute of 10 in 20
38 inflatable raft of 10 in 14 and 20
39 bottom surface of 20
40 canopy of 24, 26 and 36
41 strong, lightweight, fireproof material for 40
42 shroud line of 24, 26 and 36
44 opening in 30
45 compartment in 14
46 hatch of 28 on 30 over 44
48 cylindrical canister of 28 in 45
50 open top end of 48
52 open bottom end of 48
54 parachute foundation holder of 28 in 48
56 base member of 28 on 34
58 elastic cord of 28 between 56 and 54
60 strong durable material for 48
62 top crossbar of 54
64 middle vertical rod of 54
66 bottom crossbar of 54
68 strong durable material for 54
70 large compressible coil spring for 32
72 strong flexible durable material for 70

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An air-chute safety system for an aircraft having a fuselage with a cockpit and a tail end, and a pair of wings with engines, said system comprising:

a) a plurality of drag parachutes stored in and deployed from the tail end of the fuselage, in conjunction with an aerodynamic braking apparatus in the aircraft, which will shut down the engines during an emergency when in flight, so that the aircraft will slow down;

b) a plurality of top parachutes;

c) means for storing each of said top parachutes in vertical spaced apart relationships below a top surface of the fuselage between the cockpit and tail end thereof;

d) means for deploying each of said top parachutes from above a bottom surface of the fuselage and below each of said storing means, through the top surface of the fuselage, after said drag parachutes are deployed, so that the aircraft will slowly and safely float down to the earth;

e) a plurality of wing parachutes stored in and deployed from the wings, so as to stabilize the aircraft when it slowly and safely floats down to the earth, wherein each said drag parachute, top parachutes and wing parachute includes:

i) a canopy fabricated out of a strong, lightweight, fireproof material; and ii) a plurality of shroud lines extending from said canopy;

each of said storing means includes:

i) the fuselage having an opening in the top surface with a compartment extending to the bottom surface thereof;

ii) a hatch removably affixed to the top surface of the fuselage over said opening;

iii) a cylindrical canister having an open top end and an open bottom end, whereby said cylindrical canister is retained in said compartment directly under said hatch in the fuselage;

iv) a parachute foundation holder disposed into said cylindrical canister, whereby said canopy of said top parachute is packed into said cylindrical canister with said shroud lines connected to said parachute foundation holder;

v) a base member mounted to the interior of the bottom surface of the fuselage within said compartment; and vi) a plurality of elastic cords extending between said base member and said parachute foundation holder; and said parachute foundation holder includes:

i) a top crossbar;

ii) a middle vertical rod affixed at a first end to said top crossbar; and iii) a bottom crossbar affixed to a second end of said middle vertical rod opposite from said top crossbar, so as to form a generally I-shaped configuration.

2. An air-chute safety system as recited in claim 1, further including a plurality of inflatable rafts stored in and deployed from the bottom surface of the fuselage along a longitudinal axis thereof and the bottom surfaces of the wings, whereby said inflatable rafts being filled with oxygen from the aircraft thereby easing an impact of the aircraft upon reaching the ground and protecting the engines from damage, said inflatable rafts aiding floation of the aircraft and causing the aircraft to stay upright upon landing on a body of water.

3. An air-chute safety system as recited in claim 2, wherein said cylindrical canister is fabricated out of a strong durable material.

4. An air-chute safety system as recited in claim 3, wherein said parachute foundation holder includes:

a) a top crossbar;

b) a middle vertical rod affixed at a first end to said top crossbar; and c) a bottom crossbar affixed to a second end of said middle vertical rod opposite from said top crossbar, so as to form a generally I-shaped configuration.

5. An air-chute safety system as recited in claim 4, wherein said parachute foundation holder is fabricated out of a strong durable material.

6. An air-chute safety system as recited in claim 5, wherein each said deploying means is a large compressible coil spring extending between the bottom of said parachute foundation holder and the top of said base member, so that when said hatch is manually opened from within the aircraft, said coil spring will force said parachute foundation holder with said top parachute upwardly through said cylindrical canister, so that said top parachute will exit through said opening in the top surface of the fuselage.

7. An air-chute safety system as recited in claim 6, wherein said coil spring is fabricated out of a strong flexible durable material.

8. An air-chute safety system as recited in claim 1, wherein said parachute foundation holder is fabricated out of a strong durable material.

9. An air-chute safety system as recited in claim 1, wherein each said deploying means is a large compressible coil spring extending between the bottom of said parachute foundation holder and the top of said base member, so that when said hatch is manually opened from within the aircraft, said coil spring will force said parachute foundation holder with said top parachute upwardly through said cylindrical canister, so that said top parachute will exit through said opening in the top surface of the fuselage.

10. An air-chute safety system as recited in claim 9, wherein said coil spring is fabricated out of a strong flexible durable material.

11. An air-chute safety system as recited in claim 1, wherein said cylindrical canister is fabricated out of a strong durable material.

\* \* \* \* \*